Feb. 8, 1955                E. WOERNER                 2,701,556
           METHOD OF AND APPARATUS FOR INCREASING THE POWER
              AND EFFICIENCY OF INTERNAL-COMBUSTION ENGINES
Filed Jan. 26, 1954                              3 Sheets-Sheet 1
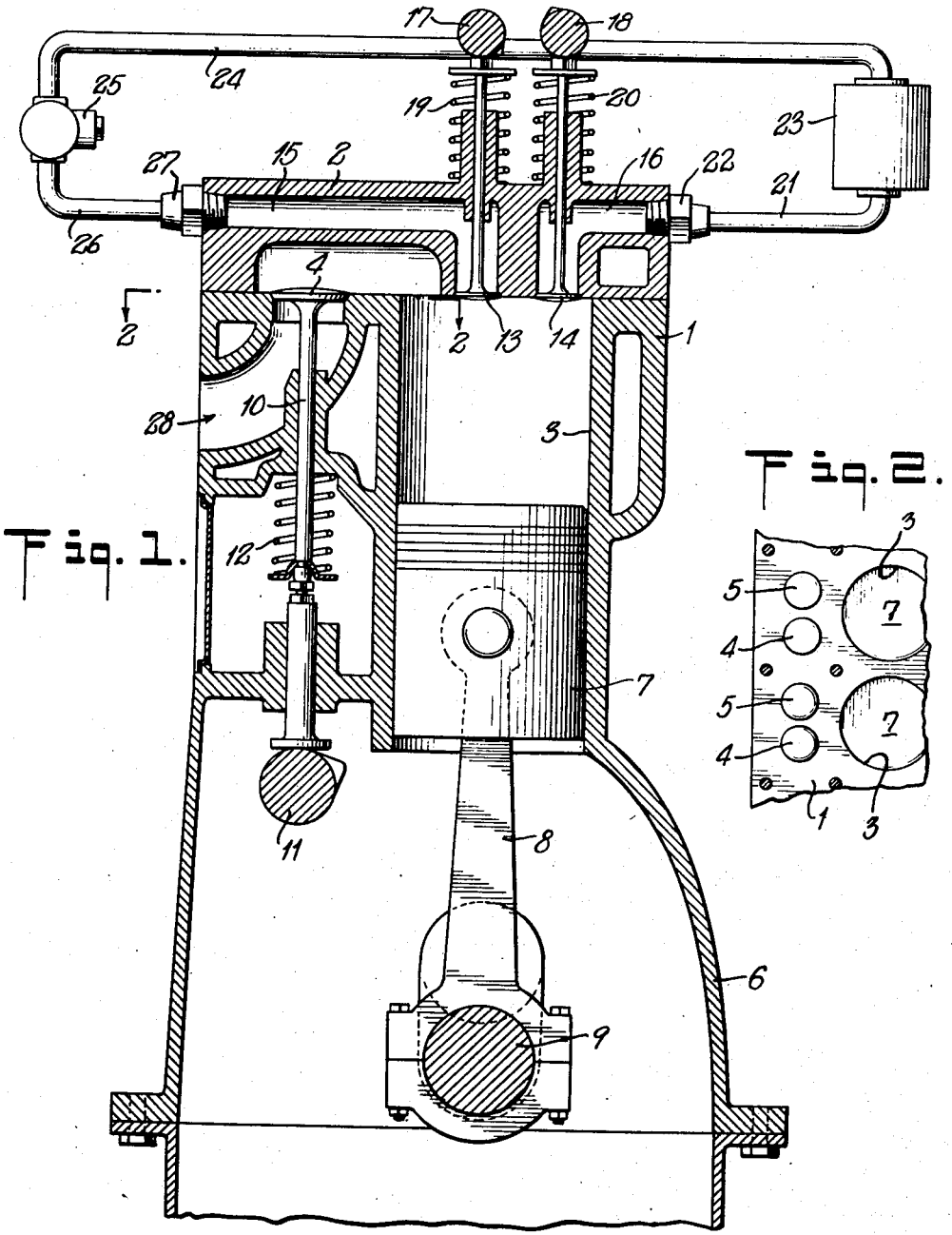
INVENTOR.
ERWIN WOERNER
BY
            ATTORNEY

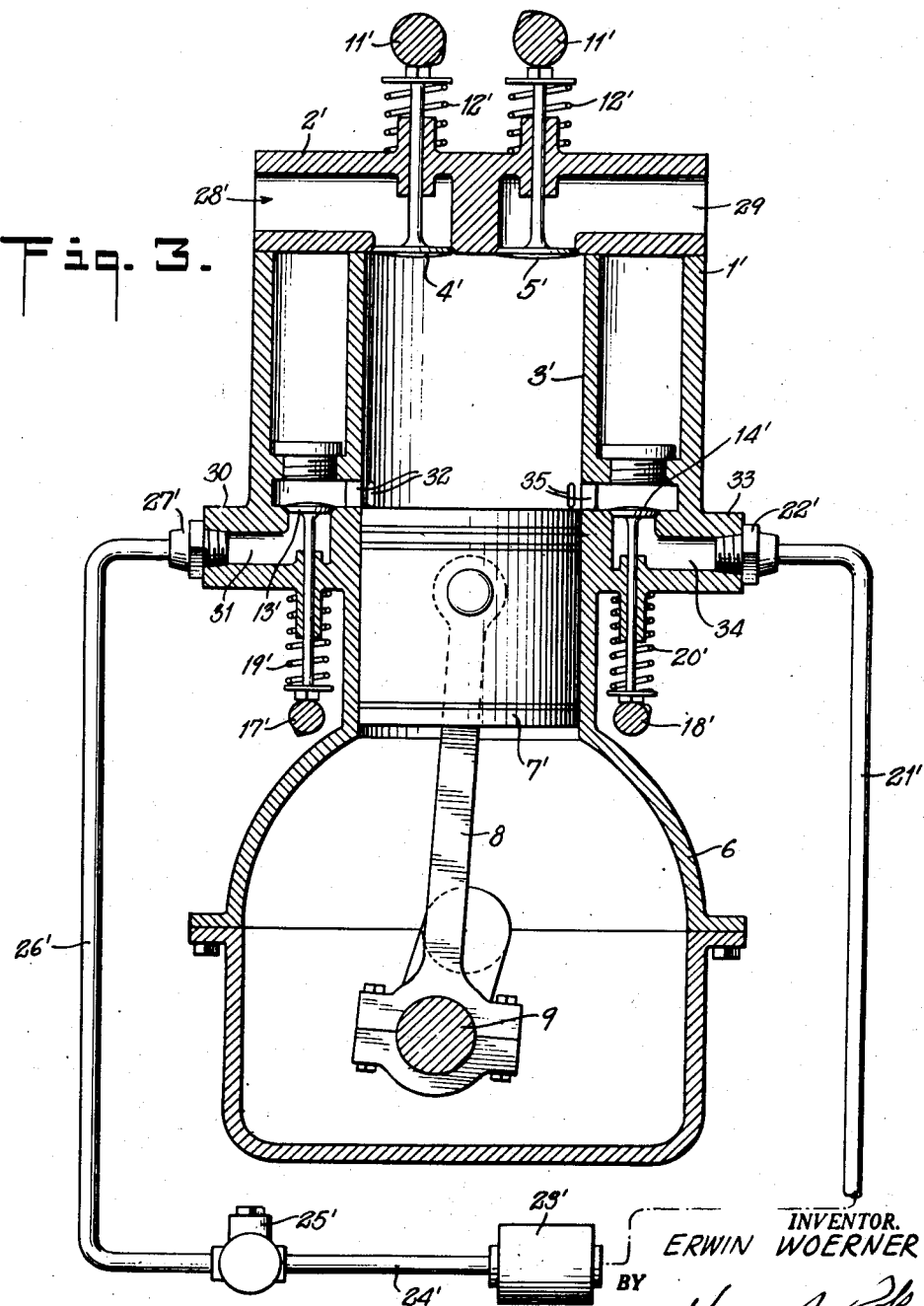

Feb. 8, 1955 E. WOERNER 2,701,556
METHOD OF AND APPARATUS FOR INCREASING THE POWER
AND EFFICIENCY OF INTERNAL-COMBUSTION ENGINES
Filed Jan. 26, 1954 3 Sheets-Sheet 3
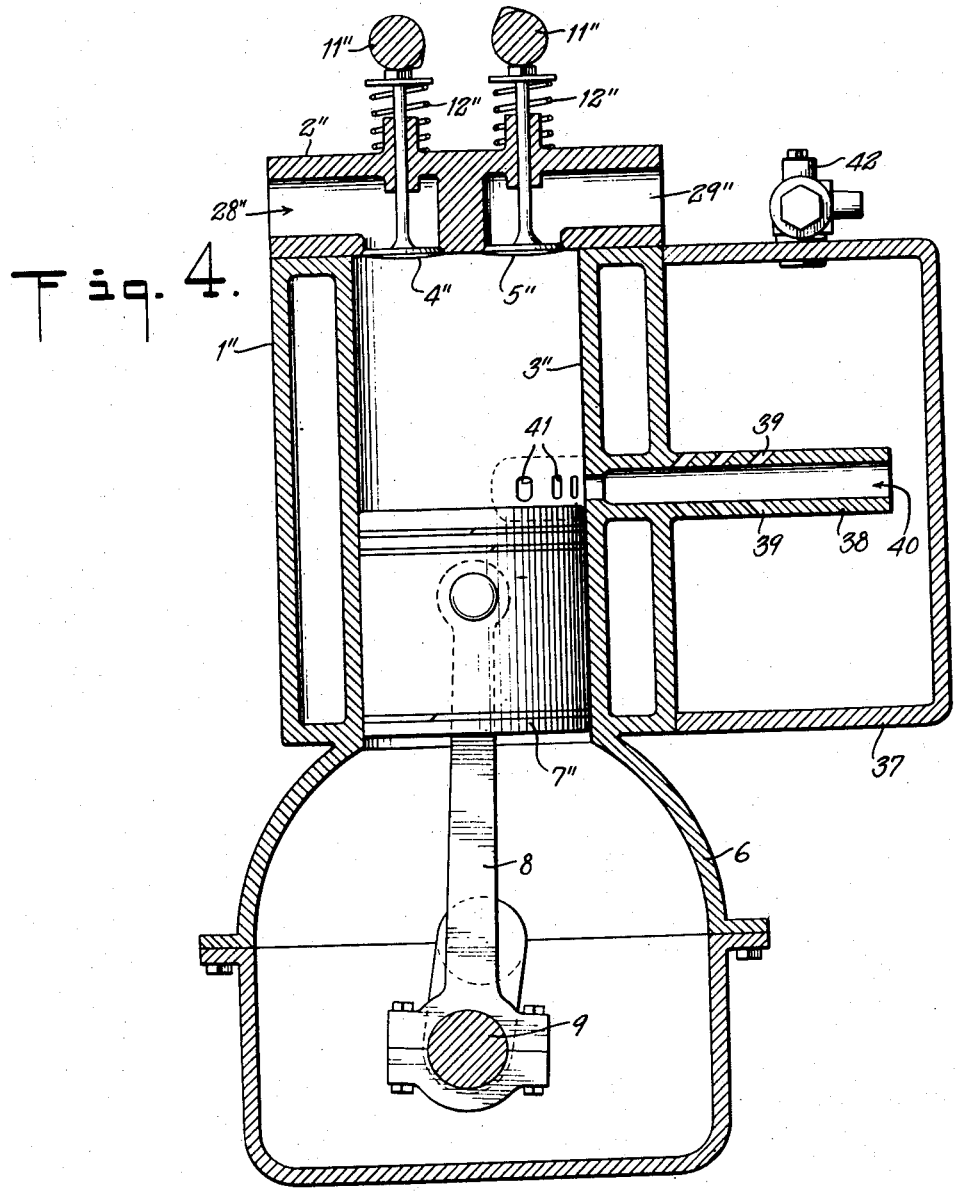
INVENTOR.
ERWIN WOERNER
BY
ATTORNEY United States Patent Office 2,701,556
Patented Feb. 8, 1955

2,701,556

METHOD OF AND APPARATUS FOR INCREASING THE POWER AND EFFICIENCY OF INTERNAL-COMBUSTION ENGINES

Erwin Woerner, Essex Fells, N. J.

Application January 26, 1954, Serial No. 406,120

17 Claims. (Cl. 123—119)

The invention relates to internal combustion engines and more particularly to a method of and apparatus for introducing an inert gas into the gaseous fuel mixture of an internal combustion engine.

Broadly, the invention comprises a method of and apparatus for collecting, under pressure, a portion of the exhaust gas from the previous explosion in the combustion chamber in the cylinder of an internal combustion engine, and for subsequently introducing said exhaust gas directly into the combustion chamber upon the compression stroke of the piston during its next cycle of operation, thereby increasing the volume of gas taken into the combustion chamber.

A prime object of the present invention is to provide apparatus for automatically collecting and introducing an inert gas, preferably the engine exhaust gas of a previous explosion, into the gaseous mixture forming the fuel in the cylinder of an internal combustion engine, upon the compression stroke of the piston, during the next cycle of operation of the piston in order to maintain an efficient combustion pressure in the combustion chamber.

Another object of the invention is to provide apparatus for automatically collecting and introducing an inert gas into the gaseous mixture forming the fuel in the cylinder of an internal combustion engine so as to increase the volume of the intake in the cylinder, eliminating at the same time the phenomena of self-ignition, which occurs when using standard gasoline, thus lessening the detonation in the operation of the engine, and this without the use of costly fuels with a high octane value or of anti-knock additives.

A further object of the invention is to provide apparatus for collecting, under pressure, and cooling a portion of the exhaust gas of an internal combustion engine, and introducing said exhaust gas into the engine cylinder to increase the mass of intake in order to maintain an efficient combustion pressure, to reduce the fuel consumption and to lessen the detonation in the operation of the engine.

Another object of the invention is to provide apparatus of this character which is simple in construction, thoroughly reliable and efficient in the working thereof, strong, durable, automatic in operation, and inexpensive to manufacture and install.

For a further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figure 1 is a vertical sectional view through the center of an internal combustion engine embodying one form of my invention.

Figure 2 is a fragmentary sectional view taken on the plane of the line 2—2 of Figure 1 and looking in the direction of the arrows.

Figure 3 is a view similar to Figure 1 but showing a modified form of the invention.

Figure 4 is a view similar to Figure 1 but showing a further modification of the invention.

In Figures 1 and 2, a portion of a four-cycle engine of well known construction, of the carburetor L-type commonly found in automobiles is shown, embodying the first form of the invention. The engine includes the usual engine block 1, head 2, cylinders 3, and the usual inlet and exhaust valves 4 and 5, respectively. In Figure 1, one of the cylinders 3 with its associated parts is shown in detail and includes the usual crank case 6, piston 7, connecting rod 8 and crank shaft 9. The cylinder is shown closed with its piston 7 in position to start its compression stroke.

Each of the inlet or intake and exhaust valves 4 and 5, respectively, of the cylinder may be operated in any convenient manner as by means of a valve stem 10 and cam shaft 11, driven at half engine speed, and is normally held in closed position by a spring 12. Each exhaust valve 5 is arranged and timed to open late, that is, near the bottom dead center, or as much as 90 degrees past bottom dead center. Of course, the stems of these valves must have a gas-tight mounting in the cylinder block.

In accordance with the present invention, I have provided apparatus for diverting a portion of the exhaust gas from the combustion chamber of the cylinder into a system wherein it is cooled and returned to the combustion chamber in order to increase the volume of intake in the chamber. This apparatus includes, for each cylinder, an additional or auxiliary intake valve 13 and an additional or auxiliary exhaust valve 14 mounted in the head 2 and controlling passage of exhaust gas to and through passages 15 and 16, respectively, in the head 2. The auxiliary intake and exhaust valves are operated by means of the cam shafts 17 and 18, respectively, at half engine speed, but are normally held closed by means of springs 19 and 20, respectively. The auxiliary exhaust valve 14 is arranged and timed to open near and before bottom dead center and to close just before the regular exhaust valve 5 opens. A pipe 21 is connected at one end to the passage 16 by means of a nipple 22 and at its other end is connected to one end of a heat exchanger 23 that is a cooler and water condenser of ordinary construction. The other end of the heat exchanger is connected to one end of a pipe 24 which has its other end connected to one side of a pressure regulator 25 of ordinary construction. A pipe 26 connects the other side of the regulator with the passage 15 in the head 2 by means of a nipple 27. A closed system or collector is thus provided for the passage, entrapment and cooling of a portion of the exhaust gas from the combustion chamber and the subsequent return thereof to the combustion chamber. If the pipes and cooler do not provide adequate capacity for the gas, a surge tank may be included.

In practice, the piston 7 as usual makes four strokes for each cycle of operation, including the intake, compression, power and exhaust strokes. The engine fires or explodes in the usual manner and as the piston moves down on its power stroke to a point near the bottom dead center, the auxiliary exhaust valve 14 opens, channeling under pressure a portion of the exhaust gas into the passage 16 and thence through the pipe 21 to the heat exchanger 23 where the exhaust gas is cooled. The gases, after being cooled, pass through pipe 24 to the pressure regulator 25, where the pressure of the cooled exhaust gas is regulated, and then pass to the pipe 26. Near bottom dead center or early in the exhaust stroke the outlet valve 14 closes and immediately thereafter the regular exhaust valve 5 opens and complete exhaustion of the remaining burned gases takes place as usual. Upon the next downward or intake stroke of the piston, the regular intake valve 4 opens as usual and a mixture of gas and air from the inlet 28 is introduced into the combustion chamber in the cylinder. Near the end of this downward stroke, the regular intake valve 4 closes, and immediately the auxiliary intake valve 13 opens and remains open during the early portion of the next stroke of the piston upwardly and then closes. During the interval of opening of valve 13 a portion of the cooled exhaust gas passes through the passage 15 into the combustion chamber of the cylinder thereby supercharging the cylinder with exhaust gas and increasing the volume of intake therein. The cylinder now contains the usual fresh charge of gas and air and in addition a portion of the cooled exhaust gas and this mixture is compressed in the usual manner upon the upward stroke of the piston. Near the top of the compression stroke, the mixture is fired or exploded in the usual manner.

It will be understood that a later opening of the regular exhaust valve 5 combined with a later closing of the auxiliary exhaust valve 14 will allow a greater quantity of the exhaust gas to enter the system.

In Figure 3, the invention is shown embodied in an over-head valve type of four-cycle internal combustion engine of ordinary construction including an engine block 1', head 2', cylinder 3', intake and exhaust valves 4' and 5', respectively, mounted in the head, and a piston 7'. The intake and outlet valves control the inlet and exhaust outlet 28' and 29, respectively, of the cylinder and are opened by the cam shafts 11', being held in closed position by the springs 12'.

In this form of the invention, the engine block 1' is formed on one side with a tubular internally screw-threaded boss 30, the opening of which connects with a passage 31 leading to a port 32 formed in the adjacent side of the wall of the cylinder 3'. A similar tubular boss 33 is formed on the opposite side of the engine block, the opening of which connects with a passage 34 leading to a port 35 in the adjacent side of the cylinder wall. An auxiliary intake valve 13' is slidably supported by the boss 30 and is opened by a cam shaft 17' but is normally held closed by a spring 19'. An auxiliary exhaust valve 14' is slidably supported by the boss 33, opened by a cam shaft 18' and normally held closed by a spring 20'. The tubular bosses 30 and 33 are connected by means of a closed system similar to the system shown in the form of the invention of Figure 1 including the pipes 21', 24' and 26', heat exchanger 23' and pressure regulator 25'.

In this form, the timing for the opening and closing of the regular exhaust valve 5' is similar to the timing for the regular exhaust valve of the form shown in Figures 1 and 2. The auxiliary valve 14' is timed to be fully open when the piston begins to uncover ports 35. The engine is fired or exploded in the usual manner and during the downward power stroke, when the upper end of the piston starts to clear the ports 32 and 35, the auxiliary exhaust valve 14' is timed to open fully so that a portion of the exhaust gas is forced out through the port 35 and passage 34 into the system. Immediately upon the closing of the auxiliary exhaust valve 14', the regular exhaust valve 5' opens and the upward exhaust stroke of the piston effects complete exhaustion of the cylinder through the regular exhaust valve. Upon the downward intake stroke of the piston, the regular valve 4' opens in the usual manner to admit the mixture of gas and air into the combustion chamber. Simultaneously with the start of the upward compression stroke, the auxiliary intake valve 13' opens to introduce the cooled trapped exhaust gas into the passage 31 and through the port 32 into the combustion chamber increasing the volume of the intake in the combustion chamber of the cylinder, whereupon the piston closes the port 32.

In all other respects, the form of invention shown in Figure 3 is similar to the form shown in Figures 1 and 2 and similar reference numerals are used to indicate similar parts.

Referring now to Figure 4, the modification herein shown is embodied in an overhead valve type internal combustion engine similar to the type of Figure 3, including an engine block 1", head 2" and cylinder 3". The usual intake valve 4" and exhaust valve 5" are provided for controlling the inlet 28" and exhaust outlet 29", respectively, of the cylinder, and are opened by the cam shafts 11" and held closed by springs 12". In this form, however, no system with auxiliary controlling valves such as shown in the forms of Figures 1 and 3 are provided but instead a tank 37 is suitably secured to one side of the engine block 1", which tank serves as a reservoir and a cooler for the exhaust gases. A manifold 38 is formed integrally with the engine block 1", midway its ends, and extends laterally thereof into the tank 37. Inside the tank, the wall of the manifold is formed with a plurality of return openings 39 communicating with the axial opening 40 of the manifold and having their axes at a certain angle with respect to the axis of the manifold. The wall of the cylinder 3" is provided with a series of horizontally arranged spaced ports 41 communicating with the axial opening of the manifold. These ports are so arranged and positioned that they are uncovered by the piston during the interval extending from approximately 20 to 50 degrees before bottom dead center to approximately 20 to 50 degrees after bottom dead center.

In this form of the invention, the intake valve 4" is timed to close before the ports 41 become uncovered by the piston 7" on its downward stroke. The exhaust valve 5" is timed to open immediately upon the covering of the ports by the upwardly moving piston.

As in the other forms of the invention, the engine is fired in the usual manner and when the piston nears the bottom dead center on its power stroke, the ports 41 in the cylinder are uncovered and a portion of the exhaust gas in the cylinder flows through the ports and through the manifold 38 into the tank 37 where it is stored and cooled. The high velocity of the movement of the exhaust gas causes most of it to flow through the axial opening 40 of the manifold and out the end thereof bypassing the angled openings 39. Early in the exhaust stroke of the piston, the ports 41 are covered by the piston and the exhaust gas which had been diverted into the tank is trapped therein. Upon closing of the ports, final exhaustion of the exhaust gas in the combustion chamber takes place by the opening of the exhaust valve 5".

The intake of the mixture of gas and air takes place in the usual manner except that the intake valve 4" is timed to close before bottom dead center, immediately before the ports 41 are uncovered by the downward intake stroke of the piston. As the piston continues downward, the ports are uncovered and the exhaust gas which is trapped in the tank now flows in reverse direction inwardly through the axial opening 40 and side openings 39 of the manifold 38 and through the ports 41 into the combustion chamber of the cylinder so as to increase the volume of the intake of the cylinder and the combustion pressure therein. The ports 41 are closed early in the compression stroke by the upwardly moving piston and compression begins to take place. The cylinder is now charged with a fresh mixture and a portion of the cooled exhaust gas which mixture is fired in the usual manner near the end of the compression stroke.

A pressure regulator 42 of ordinary construction is mounted in the top of the tank 37 to regulate the pressure of the trapped exhaust gas as required.

In all other respects, the form of the invention shown in Figure 4 is similar to the form shown in Figures 1 and 2 and similar reference numerals are used to indicate similar parts.

It will thus be seen that I have provided apparatus for supplying the engine with a combustion mixture supplemented by a supply of cooled exhaust gas so that the intake mass in the combustion chamber is increased thereby increasing the combustion efficiency which results in increased power and over-all efficiency, with a corresponding saving in fuel consumption and a lessening of the detonations which would otherwise occur. Furthermore, the fuel need not possess qualities having high octane value. Because of this, the engine is capable of operating at much higher compression ratio than usual.

While I have illustrated and described the preferred embodiments of my invention, it is to be understood that I do not limit myself to the precise constructions herein disclosed and the right is reserved to all changes and modifications coming within the scope of the invention as defined in the appended claims.

What I claim is:

1. An internal combustion engine having a cylinder with a fuel inlet and an exhaust outlet and with a plurality of openings leading to the interior thereof, valves controlling said inlet and exhaust outlet, a cooler in communication with said openings, means controlling said communication, said means being openable during the power stroke whereby a portion of the exhaust gas passes into the cooler, and being openable during the early part of the compression stroke whereby the cooled exhaust gas reenters the cylinder.

2. An internal combustion engine having a cylinder with a fuel inlet and an exhaust outlet and with a plurality of openings leading to the interior thereof, valves controlling said inlet and exhaust outlet, a cooler in communication with said openings, means controlling said communication, said means being openable during the power stroke whereby a portion of the exhaust gas passes into the cooler, and being openable during the early part of the compression stroke whereby the cooled exhaust gas reenters the cylinder, and a pressure regulator interposed between the cooler and one of said openings to regulate the pressure of the cooled exhaust gas.

3. In internal combustion engine having a cylinder with a fuel inlet and an exhaust outlet and with a plurality of ports midway its ends leading to the interior thereof, valves controlling said inlet and exhaust outlet, a piston slidable in said cylinder, a collector for exhaust gas communicating with said ports said ports being controlled by the movement of the piston and being arranged so that a portion of the exhaust gas passes into said collector during the power stroke and reenters the cylinder during the compression stroke.

4. In an internal combustion engine, a cylinder having main and auxiliary fuel inlets and main and auxiliary exhaust outlets, valves controlling said inlets and outlets, a piston slidable in said cylinder, piping connecting the auxiliary inlet and auxiliary outlet, and a cooler interposed in said piping, said auxiliary exhaust valve being openable during the latter part of the power stroke of the piston whereby a portion of the exhaust gas passes into the cooler, said auxiliary inlet valve being openable during the early part of the compression stroke whereby the cooled exhaust gas reenters the cylinder.

5. In an internal combustion engine having a cylinder, a piston slidable therein, intake and exhaust valves, and a system for collecting and cooling a portion of the exhaust gas and for reintroducing the same into the cylinder, including a cooler, auxiliary means for opening communication between said cylinder and the cooler during the latter part of the power stroke of the piston whereby a portion of the exhaust gas passes into the cooler, and means for opening communication between said cylinder and cooler during the early part of the compression stroke whereby the cooled exhaust gas reenters the cylinder.

6. In an internal combustion engine, a cylinder, a piston slidable therein, a fuel intake valve, an exhaust valve, a cooler, an auxiliary exhaust valve for opening communication between said cylinder and said cooler during the latter part of the power stroke whereby a portion of the exhaust gas passes into the cooler, and an auxiliary intake valve for opening communication between the cylinder and cooler during the early part of the compression stroke whereby the cooled exhaust gas reenters the cylinders.

7. In an internal combustion engine, a cylinder, a piston slidable therein, a fuel intake valve, an exhaust valve, a cooler, an auxiliary exhaust valve for opening communication between said cylinder and said cooler during the latter part of the power stroke whereby a portion of the exhaust gas passes into the cooler, an auxiliary intake valve for opening communication between the cylinder and cooler during the early part of the compression stroke whereby the cooled exhaust gas reenters the cylinder, and a pressure regulator interposed between the cooler and the auxiliary intake valve for regulating the pressure of the cooled exhaust gas.

8. In an internal combustion engine, a cylinder, a piston slidable therein, an intake valve controlling the introduction of a mixture of fuel into said cylinder, an exhaust valve controlling the escape of exhaust gas from said cylinder, said cylinder having a pair of openings in its head, and apparatus for collecting and cooling a portion of the exhaust gas and for reintroducing the cooled exhaust gas into the cylinder, including piping connected to said pair of openings, a cooler interposed in said piping, an auxiliary exhaust valve controlling communication between the piping and one of said openings, said auxiliary exhaust valve being openable during the latter part of the power stroke of the piston whereby a portion of the heated exhaust gas passes into the piping, and an auxiliary intake valve controlling communication between the piping and the other opening, said auxiliary intake valve being openable during the early part of the compression stroke of the piston whereby the cooled exhaust gas reenters the cylinder.

9. In an internal combustion engine, a cylinder, a piston slidable therein, an intake valve controlling the introduction of a mixture of fuel into the cylinder, an exhaust valve controlling the escape of exhaust gas from said cylinder, said cylinder having a pair of openings in its head, and apparatus for collecting and cooling a portion of the exhaust gas and for reintroducing the cooled exhaust gas into the cylinder, a cooler interposed in said piping, an auxiliary exhaust valve controlling communication between the piping and one of said openings, said auxiliary exhaust valve being openable during the latter part of the power stroke of the piston whereby a portion of the exhaust gas passes into the piping, an auxiliary intake valve controlling the communication between the piping and the other opening, said auxiliary intake valve being openable during the early part of the compression stroke of the piston whereby the cooled exhaust gas reenters the cylinder, and a pressure regulator interposed in the piping between the cooler and said auxiliary intake valve for regulating the pressure of the cooled exhaust gas.

10. In an internal combustion engine, a cylinder having a main intake and a main exhaust outlet in the head thereof, valves controlling said intake and outlet, a piston in said cylinder, said cylinder having opposed ports midway its ends and having an auxiliary intake leading to one of said ports and an auxiliary exhaust outlet leading to the other of said ports, said ports being adapted to be closed by said piston, and apparatus for collecting and cooling a portion of the exhaust gas and for reintroducing same into the cylinder, including a piping connected to said auxiliary intake and outlet, a cooler interposed in said piping, a valve in said auxiliary exhaust outlet openable during the latter part of the power stroke of the piston whereby a portion of the exhaust gas passes into the piping, and a valve in said auxiliary intake openable during the early part of the compression stroke whereby the cooled exhaust gas reenters the cylinder.

11. In an internal combustion engine, a cylinder having a main intake and a main exhaust outlet in the head thereof, valves controlling said intake and outlet, a piston slidable in said cylinder, said cylinder having opposed ports midway its ends and having an auxiliary intake leading to one of said ports, an auxiliary exhaust outlet leading to the other of said ports, said ports being adapted to be closed by said piston, and apparatus for collecting and cooling a portion of the exhaust gas and for reintroducing same into the cylinder, including a piping connected to said auxiliary intake and outlet, a cooler interposed in said piping, a valve in said auxiliary exhaust outlet openable during the latter part of the power stroke of the piston whereby a portion of the exhaust gas passes into the piping, a valve in said auxiliary intake openable during the early part of the compression stroke whereby the cooled exhaust gas reenters the cylinder, and a pressure regulator interposed in the piping between the cooler and said auxiliary intake valve for regulating the pressure of the cooled exhaust gas.

12. In an internal combustion engine, a cylinder having a fuel inlet and an exhaust outlet in its head and having spaced ports at one side thereof, midway its ends, a piston slidable in said cylinder, and apparatus for collecting and cooling a portion of the exhaust gas and for reintroducing same into the cylinder, including a cooling tank secured to one side of the cylinder, a tubular manifold connected to the cylinder and communicating at one end with the ports in the cylinder and at its other end with the interior of the tank, said ports being arranged to be closed by said piston and being openable during the interval from approximately 20 to 50 degrees before bottom dead center to 20 to 50 degrees after bottom dead center, said ports being openable during the latter part of the power stroke of the piston whereby a portion of the exhaust gas passes into the cooling tank, and being openable during the early part of the compression stroke whereby the cooled exhaust gas reenters the cylinder.

13. In an internal combustion engine, a cylinder having a fuel inlet and an exhaust outlet in its head and having spaced ports at one side thereof, midway its ends, a piston slidable in said cylinder, and apparatus for collecting and cooling a portion of the exhaust gas and for reintroducing same into the cylinder, including a cooling tank secured to one side of the cylinder, a tubular manifold connected to the cylinder and communicating at one end with the ports in the cylinder and at its other end with the interior of the tank, said ports being arranged to be closed by said piston and being openable during the interval from approximately 20 to 50 degrees before bottom dead center to 20 to 50 degrees after bottom dead center, said ports being openable during the latter part of the power stroke of the piston whereby a portion of the exhaust gas passes into the cooling tank, and being openable during the early part of the compression stroke whereby the cooled exhaust gas reenters the cylinder, said manifold having spaced openings in the opposed sides of its wall, the axes of said openings being arranged at an angle to the axis of the manifold.

14. In an internal combustion engine, a cylinder having a fuel inlet and an exhaust outlet in its head and having spaced ports at one side thereof, midway its ends, a piston slidable in said cylinder, and apparatus for collecting and cooling a portion of the exhaust gas and for reintroducing same into the cylinder, including a cooling tank secured to one side of the cylinder, a tubular manifold connected to the cylinder and communicating at one end with the ports in the cylinder and at its other end with the interior of the tank, said ports being arranged to be closed by said piston and being openable during the interval from approximately 20 to 50 degrees before bottom dead center to 20 to 50 degrees after bottom dead center, said ports being openable during the latter part of the power stroke of the piston whereby a portion of the exhaust gas passes into the cooling tank, and being openable during the early part of the compression stroke whereby the cooled exhaust gas reenters the cylinder, said manifold having spaced openings in the opposed sides of its wall, the axes of said openings being arranged at an angle to the axis of the manifold, and a pressure regulator associated with said tank for regulating the pressure of the exhaust gases therein.

15. The method of operating an internal combustion engine consisting of trapping a portion of the exhaust gas near the end of the power stroke and the beginning of the exhaust stroke of the engine, cooling the same, regulating the pressure thereof, and then reintroducing the cooled exhaust gas into the cylinder during the early part of the compression stroke.

16. A four-cycle internal combustion engine having a cylinder with a fuel inlet and an exhaust outlet and with a plurality of openings leading to the interior of the cylinder, valves controlling said inlet and said exhaust outlet, a collector for exhaust gases communicating with said openings, means controlling communication between said openings and said collector, said means being momentarily opened near the end of the power stroke and the early part of the exhaust stroke whereby a portion of the exhaust gas passes into said collector and said means being also momentarily opened near the end of the intake stroke and the early part of the compression stroke so that said portion of the exhaust gas reenters said cylinder.

17. The method of operating an internal combustion engine consisting of trapping a portion of the exhaust gas near the end of the power stroke and the beginning of the exhaust stroke of the engine, and then reintroducing said portion of the exhaust gas into the cylinder near the end of the intake stroke and the early part of the compression stroke.

References Cited in the file of this patent

UNITED STATES PATENTS

| | | |
|---|---|---|
| 1,530,864 | Vaughan | Mar. 24, 1925 |
| 1,788,077 | Zaikowsky | Jan. 6, 1931 |